(12) United States Patent
Takahashi

(10) Patent No.: US 6,819,848 B2
(45) Date of Patent: Nov. 16, 2004

(54) METHOD OF WINDING OPTICAL FIBER ON REEL

(75) Inventor: Fumio Takahashi, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/761,188

(22) Filed: Jan. 22, 2004

(65) Prior Publication Data

US 2004/0151453 A1 Aug. 5, 2004

Related U.S. Application Data

(63) Continuation of application No. 10/166,651, filed on Jun. 12, 2002, now Pat. No. 6,744,959.

(30) Foreign Application Priority Data

Jun. 13, 2001 (JP) ........................................ 2001-177843

(51) Int. Cl.$^7$ ................................................ G02B 6/00
(52) U.S. Cl. ........................ 385/123; 385/127; 385/135
(58) Field of Search ................................ 385/123–128, 385/134–137

(56) References Cited

U.S. PATENT DOCUMENTS

| | | | |
|---|---|---|---|
| 5,852,701 A | 12/1998 | Kato et al. | |
| 5,917,983 A | 6/1999 | Page et al. | |
| 6,073,877 A | 6/2000 | Wislinski | |
| 2002/0003936 A1 | 1/2002 | Kaliszek | |
| 2002/0122643 A1 | 9/2002 | Bueschelberger et al. | |

FOREIGN PATENT DOCUMENTS

| | | |
|---|---|---|
| JP | 1-321259 | 12/1989 |
| JP | 5-273416 | 10/1993 |
| JP | 9-100064 | 4/1997 |

OTHER PUBLICATIONS

J.Y. Hung, et al, IEEE Transactions on Industrial Electronics, vol. 39, No. 3, pp. 258–267, "Precision Winding of Fiber Optic Filament—Part 1: Winding Characteristics", Jun. 1, 1992.

Primary Examiner—Hemang Sanghavi
Assistant Examiner—Scott Alan Knauss
(74) Attorney, Agent, or Firm—Oblon, Spivak, McClelland, Maier & Neustadt, P.C.

(57) ABSTRACT

A method of winding an optical fiber on a reel, utilizing
the optical fiber having the following characteristics:
effective area is larger than 50 $\mu m^2$,
zero dispersion wavelength is outside a range of 1530–1565 nm,
absolute value of the dispersion value in the entire wavelength range of 1530–1565 nm is in a range of 2–14 ps/nm/km, and
bending loss at a 1550 nm-wavelength is in 1–100 dB/m when wound at a diameter of 20 mm, and
the reel with a barrel diameter of 100 to 200 mm; and winding the optical fiber on the reel with satisfying d<p<2d and $0.004 \leq (2T/D) \leq 0.007$, wherein d is a coating outer diameter of the fiber (mm), D is a barrel diameter (mm), T is a winding tension (N), and p is a winding pitch (mm).

4 Claims, 3 Drawing Sheets

METHOD OF WINDING OPTICAL FIBER ON REEL

This application is a Continuation of Ser. No. 10/166,651 filed Jun. 12, 2002, now U.S. Pat. No. 6,744,959.

FIELD

The present invention relates to a method of winding an optical fiber on a reel suitable for storage and transportation of the optical fiber.

BACKGROUND

Conventionally, a technique has been keenly studied to increase transmission capacity in optical transmission using an optical fiber.

To increase transmission capacity in optical transmission, an optical fiber for optical transmission is required to be single-mode with the wavelength of use. This is because, when transmission through an optical fiber is performed in a plurality of modes, a mode dispersion inevitably occurs due to a difference in group velocity for each transmission mode, resulting in a deterioration of signal waveform.

In view of this, a single mode optical fiber (SMF) having a zero dispersion wavelength around the wavelength of 1300 nm was used. By this optical fiber, an optical transmission with transmission distance exceeding 100 km and transmission capacity of several hundreds of Mbps were realized. As shown, for example, in FIG. 6, this SMF had a refractive index distribution structure composed of a central region 61 serving as the core and a clad 62.

On the other hand, since the transmission loss of an optical fiber becomes minimum around the wavelength of 1550 nm, it was desirable to perform optical transmission using this wavelength band. Therefore, a dispersion-shifted optical fiber (DSF) having a dual shape refractive index distribution structure and the zero dispersion wavelength around the wavelength of 1550 nm was realized.

Further, in these days, wavelength division multiplexing optical transmission system (WDM system) is being very actively studied and developed as a technique for further increasing transmission capacity. Then, an optical fiber suitable for use in WDM optical transmission is being examined from various viewpoints.

When using an optical fiber in WDM system, it is required that there should be no zero dispersion wavelength in the operating wavelength band, from the view point of preventing four-wave mixing. Thus, a non-zero dispersion-shifted optical fiber (NZDSF) has been developed. The NZDSF little involves four-wave mixing, so that, at present, it is regarded as most suitable for WDM system, and it is being rapidly put into practical use.

Further, taking into account broadband WDM system, some NZDSFs have a large effective core sectional area ($A_{eff}$) in order to reduce non-linearity, and others have a reduced dispersion slope in order to decrease dispersion difference between wavelengths.

Specifically, the characteristics of a conventional DSF are, for example, as follows: $A_{eff}$, 50 $\mu m^2$; dispersion slope, 0.07 ps/nm$^2$/km.

In contrast, an example of an NZDSF with an increased $A_{eff}$ has the following characteristics: $A_{eff}$, 72 $\mu m^2$; dispersion slope, 0.11 ps/nm$^2$/km. In this example, the emphasis is on the enlargement of $A_{eff}$.

An example of an NZDSF with a reduced dispersion slope has the following characteristics: $A_{eff}$, 55 $\mu m^2$; dispersion slope, 0.045 ps/nm$^2$/km. In this example, the dispersion slope is reduced while maintaining an $A_{eff}$ equal to or not smaller than that of the conventional DSF.

Some NZDSFs have characteristics other than those mentioned above. To achieve these characteristics, the refractive index distribution structure of NZDSFs tends to become more complicated than that of the conventional DSF.

Generally speaking, an optical fiber is shipped in a state, in which it is wound on a reel. A too-high winding tension when winding the optical fiber on the reel leads to an increase in transmission loss, whereas a too-low winding tension leads to loosen the winding on the reel due to vibration during transportation, and the like.

In particular, in the case of an NZDSF, the refractive index distribution structure is rather complicated as compared with that of a conventional DSF, in order to enlarge the $A_{eff}$ and reduce the dispersion slope. Thus, the NZDSF is rather sensitive against bending and lateral pressure as compared with the conventional DSF.

For example, when wound at a bending diameter of 20 mm, the loss increase at a wavelength of 1550 nm is less than 1 dB/m in the conventional DSF, whereas it is approximately 5 dB/m in the optical fiber with reduced dispersion slope and approximately 20 dB/m in the optical fiber with enlarged $A_{eff}$.

Thus, it is important to optimize the winding condition of the optical fiber on a reel. For example, there is a method proposed as a method of winding a conventional DSF around a bobbin. In this method, the optimization of the winding condition is attempted by controlling the winding tension (0.1 N to 1 N) and the hardness of the barrel of the bobbin, in order to minimize an increase in transmission loss.

However, as stated in the above, the NZDSF is rather sensitive against bending and lateral pressure as compared with the conventional DSF. Thus, if the technique for a DSF is applied to the winding condition for the NZDSF, it would lead to an increase in transmission loss.

Further, to minimize the increase in transmission loss due to lateral pressure in an optical fiber, it is necessary to take into account not only the tension but also the winding diameter, winding pitch, and the like. Also from this viewpoint, the technique for winding DSF is to be regarded as incomplete.

Regarding DSFs including NZDSFs, it is known that minimizing the increase in bending loss is possible by shifting the cutoff wavelength to the longer wavelength side in order to enlarge the $A_{eff}$.

However, while the conventional technique proves convenient for an optical fiber used around 1550 nm wavelength, it does not allow single-mode transmission around the wavelength of 1300 nm, which means it is not suitable for optical transmission around the wavelength of 1300 nm.

Thus, at present, it is considered that an increase in bending loss is inevitable in an optical fiber suitable for use in WDM system and intended for single mode operation around the wavelength of 1300 nm. There is a great demand for a technique for winding such an optical fiber on a reel, without increasing transmission loss and loosening the winding.

SUMMARY

The present invention is a method of winding an optical fiber on a reel, utilizing
the optical fiber having the following characteristics:
  effective area $A_{eff}$ is larger than 50 $\mu M^2$,
  zero dispersion wavelength is outside a wavelength range of 1530 to 1565 nm, absolute value of the dispersion value in the entire wavelength range of 1530 to 1565 nm is in a range of 2 to 14 ps/nm/km, and bending loss at a wavelength of 1550 nm is in a range of 1 to 100 dB/m when wound at a diameter of 20 mm; and the reel with a barrel diameter of not less than 100 mm and not more than 200 mm;

characterized by winding the optical fiber on the reel with satisfying conditions of d<p<2d and 0.004≦(2T/D)≦0.007, wherein d is a coating outer diameter of the optical fiber (mm), D is a barrel diameter of the reel (mm), T is a winding tension (N), and p is a winding pitch (mm).

In this specification, the terms are based on the definitions according to ITU-T G. 650 unless defined specifically.

Other and further features and advantages of the invention will appear more fully from the following description, with referring to the accompanying drawings.

DETAILED DESCRIPTION

Figure 1:
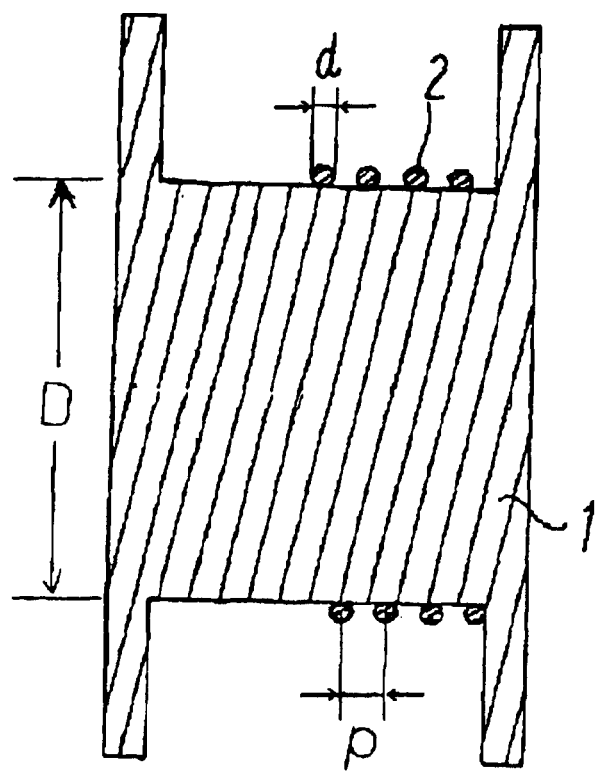
FIG. 1 is a sectional view of a reel for illustrating a winding method of an optical fiber on a reel according to an embodiment of the present invention.

According to the present invention, there is provided the following means:

(1) A method of winding an optical fiber on a reel, utilizing the optical fiber having the following characteristics:
effective area $A_{eff}$ is larger than 50 $\mu m^2$,
zero dispersion wavelength is outside a wavelength range of 1530 to 1565 nm,
absolute value of the dispersion value in the entire wavelength range of 1530 to 1565 nm is in a range of 2 to 14 ps/nm/km, and
bending loss at a wavelength of 1550 nm is in a range of 1 to 100 dB/m when wound at a diameter of 20 mm; and
the reel with a barrel diameter of not less than 100 mm and not more than 200 mm;

characterized by winding the optical fiber on the reel with satisfying conditions of d<p<2d and 0.004≦(2T/D)≦0.007, wherein d is a coating outer diameter of the optical fiber (mm), D is a barrel diameter of the reel (mm), T is a winding tension (N), and p is a winding pitch (mm).

(2) The method according to the above (1), wherein a cutoff wavelength of the optical fiber after formed as a cable is not more than 1260 nm.

(3) The method according to the above (1), wherein the optical fiber has two or more annular regions between a central region and a clad, and the minimum refractive index of at least one annular region is negative.

The method of winding an optical fiber on a reel according to the above item (1) is accomplished as a result of intensive studies based on the experimentally ascertained fact that the winding conditions for the above optical fiber, which is sensitive against bending and lateral pressure, are influenced more by the reel barrel diameter and the optical fiber winding pitch than by the hardness of the reel barrel portion.

Further, by the method of the above item (1), it is possible to wind the optical fiber on a reel in a manner suitable for storage, and transportation, such that no loosening of the winding occurs due to vibration during transportation, and the like, without increasing the transmission loss. As a result, it is possible to prevent breakage when letting out the optical fiber from the reel to form it into a cable.

It is desirable that a reel, around which an optical fiber is wound, is being as compact as possible and allows winding of a lot of optical fiber, from the viewpoint of reductions of storage cost and transportation cost. From this point of view, it is desirable for the reel barrel diameter D to be not more than 200 mm.

In some cases, the optical fiber is stored for a long period of time in a state, in which it is wound around the reel. Therefore, when the reel barrel diameter D is small, the optical fiber may result in breaking due to excess fiber strain. Thus, taking into account the reliability in long-term storage, it is desirable for the reel barrel diameter D to be not less than 100 mm. The reel barrel diameter is preferably in the range of 140 mm to 180 mm.

According to the method of winding an optical fiber around a reel according to the above item (2), an optical fiber, whose cutoff wavelength after formed into a cable is not more than 1260 nm, can be wound on a reel.

According to the method of winding an optical fiber around a reel according to the above item, (3), even an optical fiber, which has two or more annular regions between a central region and a clad and in which fiber the minimum refractive index of at least one annular region being negative, can be wound on a reel without increasing the transmission loss and loosening the winding.

Embodiments of the present invention will now be explained with reference to the drawings.

FIG. 1 is a sectional view of a reel for illustrating a winding method of an optical fiber on a reel according to an embodiment of the present invention. In FIG. 1, numeral 1 indicates a reel, and numeral 2 indicates an optical fiber. In FIG. 1, the first layer of the optical fiber 2 has been wound halfway.

The barrel diameter D of the reel 1 is not less than 100 mm and not more than 200 mm. The optical fiber 2, whose outer diameter after coated is d (mm), is wound on the reel 1 with a tension T (N) and at a winding pitch of p (mm). As shown in FIG. 1, the winding pitch p means the distance between the centers of adjacent portions of the optical fiber 2 in the same layer.

The optical fiber 2 is an NZDSF whose effective core sectional area $A_{eff}$ is generally larger than 50 $\mu m^2$, and preferably larger than 60 $\mu m^2$. The optical fiber 2 has a zero dispersion wavelength outside a wavelength range of 1530 to 1565 nm, and the absolute value of the dispersion value in the entire wavelength range of 1530 to 1565 nm is generally in a range of 2 to 14 ps/nm/km, and preferably in a range of 6 to 10 ps/nm/km. Further, the optical fiber has a bending loss at a wavelength of 1550 nm, generally in a range of 1 to 100 dB/m, and preferably in a range of 1 to 50 dB/m, when it is wound at a diameter of 20 mm.

The optical fiber preferably has a small dispersion slope, and the dispersion slope is generally 0.10 ps/nm$^2$/km or less, preferably 0.04 to 0.10 ps/nm$^2$/km.

The transmission loss of the optical fiber is generally 0.25 dB/km or less, and preferably 0.19 to 0.22 dB/km. The increase in transmission loss before and after wound on a reel is preferably 0.03 dB/m or less.

The coating outer diameter of the optical fiber is generally 0.23 to 0.27 mm.

When the optical fiber 2 is wound on the reel 1, the winding conditions are controlled so as to satisfy the following conditions $d<p<2d$ and $0.004 \leq (2T/D) \leq 0.007$, where D is the barrel diameter (mm) of the reel 1, T is the winding tension (N), d is the outer diameter (mm) of the optical fiber 2 after coating, and p is the winding pitch (mm). As a result, even the optical fiber 2, which has the above characteristics and is sensitive against bending and lateral pressure, can be wound on the reel 1 without increasing the transmission loss and loosening the winding. It is further preferable to set the winding pitch to $1.5d<p<2.0d$. In addition to this, it is further preferable to set the winding tension to $0.005 \leq (2T/D) \leq 0.007$.

In accordance with the present invention, it is possible to wind an optical fiber without increasing the transmission loss. At the same time, the thus-wound fiber is suitable for storage, transportation, and the like, and is prevented from loosening due to vibration during transportation, and the like. As a result, the present invention is advantageous since it is possible to prevent breakage of an optical fiber when letting out the optical fiber from the reel to form it into a cable. The method of the present invention is especially effective for winding a non-zero dispersion-shifted optical fiber.

The present invention will be described in more detail based on examples given below, but the present invention is not meant to be limited by these examples.

EXAMPLES

Table 1 shows the characteristics of two optical fibers α and β of NZDSFs. Each of the optical fibers α and β has a clad with an outer diameter of 125 μm, which is covered with two layers of an ultraviolet curing urethane acrylate type resin to exhibit a coating outer diameter of nominal 250 μm. In Table 1, the unit of dispersion is ps/nm/km, the unit of dispersion slope is ps/nm$^2$/km, and the unit of transmission loss is dB/km, and the unit of bending loss at a bending diameter of 20 mm is dB/m.

TABLE 1

Figure 2:
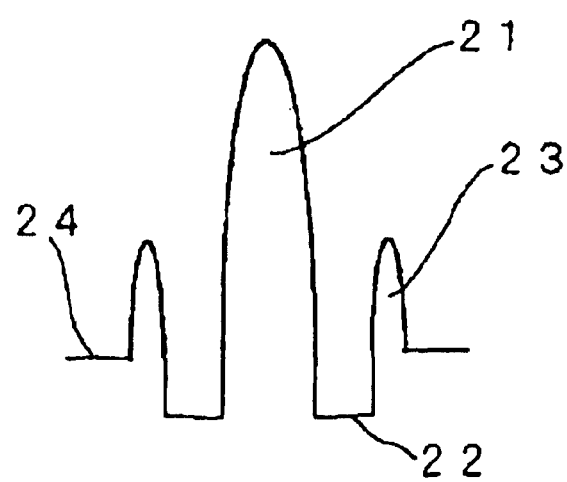
FIG. 2 is a diagram showing a refractive index distribution structure of an optical fiber that is used in a working example of a winding method of an optical fiber on a reel according to the present invention.
Figure 3:
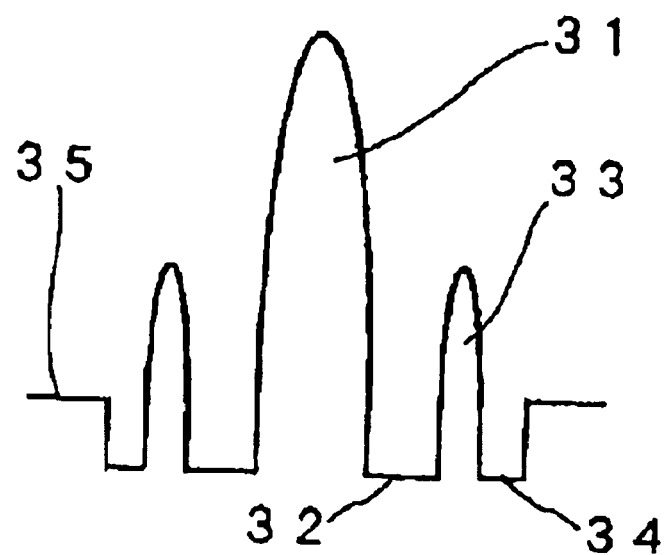
FIG. 3 is a diagram showing another refractive index distribution structure of an optical fiber that is used in a working example of a winding method of an optical fiber on a reel according to the present invention.

| Name | Dispersion | Dispersion slope | Transmission loss | Bending loss | Structure |
|---|---|---|---|---|---|
| α | 4 | 0.045 | 0.21 | 5 | FIG. 2 |
| β | 6 | 0.11 | 0.21 | 20 | FIG. 3 |

The optical fiber α has the refractive index distribution structure as shown in FIG. 2. The refractive index distribution structure has a first annular region 22 and a second annular region 23 between a central region 21 constituting the core and a clad 24. The refractive index of the central region 21 and the refractive index of the second annular region 23 are higher than the refractive index of the clad 24, and the refractive index of the first annular region 22 is lower than the refractive index of the clad 24. While the refractive index of the first annular region 22 in FIG. 2 is lower than the refractive index of the clad 24, it is also possible for the refractive index of the first annular region 22 to be approximately the same as the refractive index of the clad 24.

The optical fiber β has the refractive index distribution structure as shown in FIG. 3. The refractive index distribution structure has a first annular region 32, a second annular region 33, and a third annular region 34 between a central region 31 and a clad 35. Then, the refractive index of the central region 31 and the refractive index of the second annular region 33 are higher than the refractive index of the clad 35, and the refractive index of the first annular region 32 and the refractive index of the third annular region 34 are lower than the refractive index of the clad 35. While the refractive index of the first annular region 32 in FIG. 3 is lower than the refractive index of the clad 35, it is also possible for the refractive index of the first annular region 32 to be approximately the same as the refractive index of the clad 35.

The above optical fibers α and β were wound on reels having a barrel diameter D of 100 to 200 mm by a length of approximately 25 km. It was found out that when conditions $d<p<2d$ (i.e., $0.25<p<0.50$) and $0.004 \leq (2T/D) \leq 0.007$ were satisfied, neither an increase in transmission loss nor loosening of the winding occurred, whereas when the condition $d<p<2d$ or $0.004 \leq (2T/D) \leq 0.007$ was not satisfied, an increase in transmission loss or loosening of the winding occurred.

More specifically, when $p \geq 2d$, winding the optical fibers α and β could result that an optical fiber portion in an upper layer locally sunk between optical fiber pitches in a lower layer, thereby causing an increase in transmission loss. When $(2T/D)<0.004$, the winding tension T was deficient, so that there was a higher possibility of the loosening of the winding occurring. When $(2T/D)>0.007$, the winding tension T was too large, and due to the influence of the lateral pressure applied to the optical fiber 2, the transmission loss increased. In particular, when $(2T/D)>0.007$ and $p \geq 2d$, the increase in transmission loss could exceed the transmission loss of the optical fiber itself.

Table 2 shows the results obtained by winding optical fibers α and β on reels as described above. Regarding transmission loss, it was rated as "○" (good) when the increase in transmission loss was not more than 0.03 dB/km. Regarding winding, each reel was dropped in the direction of the central axis thereof from a height of 75 cm, and was visually checked for any such unwinding as would affect the subsequent winding. It was rated as "○" (good) when no such loosening was caused.

TABLE 2

| Fiber name | Reel barrel diameter D | Diameter after coated d | Winding pitch p | 2T/D | Transmission loss | Winding state |
|---|---|---|---|---|---|---|
| α | 150 | 0.25 | 0.40 | 0.0035 | ○ | X |
| α | 150 | 0.25 | 0.40 | 0.0055 | ○ | ○ |
| α | 150 | 0.25 | 0.40 | 0.0075 | X | ○ |
| α | 150 | 0.25 | 0.45 | 0.0055 | ○ | ○ |
| α | 150 | 0.25 | 0.55 | 0.0055 | ○ | X |

TABLE 2-continued

| Fiber name | Reel barrel diameter D | Diameter after coated d | Winding pitch p | 2T/D | Transmission loss | Winding state |
|---|---|---|---|---|---|---|
| α | 170 | 0.25 | 0.40 | 0.0035 | X | ○ |
| α | 170 | 0.25 | 0.40 | 0.0055 | ○ | ○ |
| α | 170 | 0.25 | 0.40 | 0.0075 | X | ○ |
| α | 170 | 0.25 | 0.45 | 0.0055 | ○ | ○ |
| β | 150 | 0.25 | 0.40 | 0.0035 | ○ | X |
| β | 150 | 0.25 | 0.40 | 0.0055 | ○ | ○ |
| β | 150 | 0.25 | 0.40 | 0.0075 | X | ○ |
| β | 150 | 0.25 | 0.45 | 0.0055 | ○ | ○ |
| β | 150 | 0.25 | 0.55 | 0.0055 | ○ | X |
| β | 170 | 0.25 | 0.40 | 0.0035 | ○ | X |
| β | 170 | 0.25 | 0.40 | 0.0055 | ○ | ○ |
| β | 170 | 0.25 | 0.40 | 0.0075 | X | ○ |
| β | 170 | 0.25 | 0.45 | 0.0055 | ○ | ○ |

As show in Table 2, even in the case of the optical fibers α and β whose refractive index distribution structures were rather complicated (as compared with a DSF) as shown in FIGS. 2 and 3 and which were sensitive against bending and lateral pressure, the method of the present invention made it possible to wind them on reels so as not to increase the transmission loss or loosen the winding.

In Table 2, when the value 2T/D was 0.0075, the condition corresponded to a condition for winding the conventional DSF on a reel. It is apparent that such the condition was not appropriate as the conditions for winding the optical fibers α and β on reels. Thus, in the winding condition of the present invention, the value of 2T/D is smaller than that in the conventional winding condition.

It goes without saying that the measurement results of Table 2 are only given by way of example and that the scope of the present invention is not restricted to this table.

If also goes without saying that the refractive index distribution structure of the optical fiber for the method for winding an optical fiber on a reel according to the present invention is not restricted to those shown in FIGS. 2 and 3.

Figure 4:
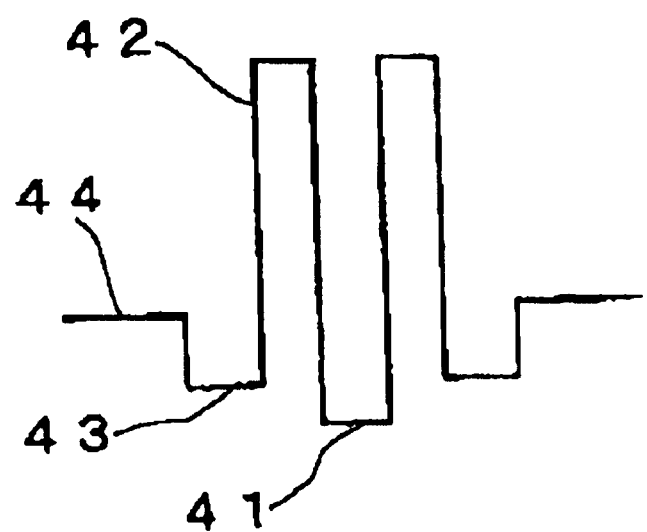
FIG. 4 is a diagram showing another refractive index distribution structure of an optical fiber that can be used in a winding method of an optical fiber on a reel according to the present invention.

For example, it is also possible to adopt the refractive index distribution structure as shown in FIG. 4, which has a first annular region 42 and a second annular region 43 between a central region 41 and a clad 44. Further, the refractive index of the central region 41 and the refractive index of the second annular region 43 are lower than the refractive index of the clad 44, and the refractive index of the first annular region 42 is higher than the refractive index of the clad 44. While the refractive index of the second annular region 43 is lower than the refractive index of the clad 44 in FIG. 4, this should not be construed restrictively. It is also possible for the maximum refractive index of the second annular region 43 to be higher than the refractive index of the clad 44.

Figure 5:
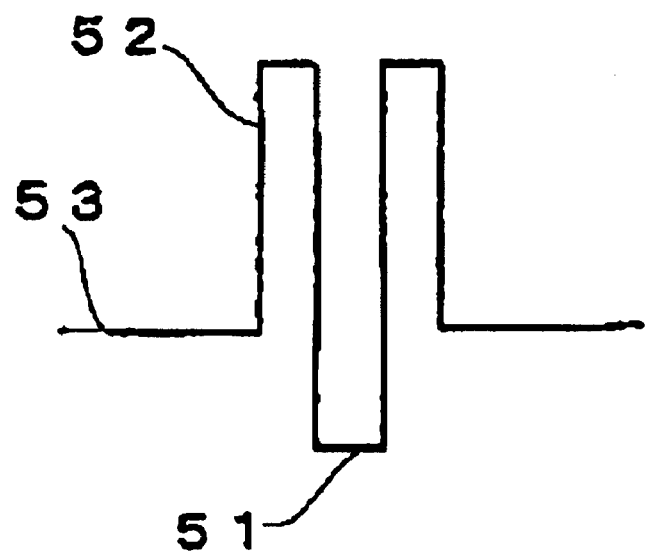
FIG. 5 is a diagram showing still another refractive index distribution structure of an optical fiber that can be used in a winding method of an optical fiber on a reel according to the present invention.
Figure 6:
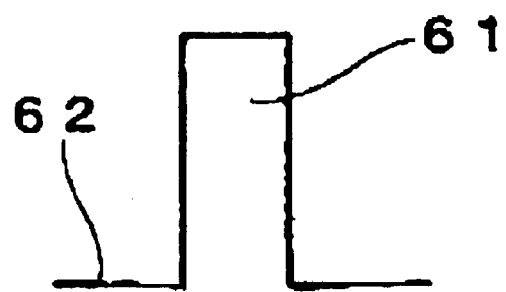
FIG. 6 is an explanatory diagram showing the refractive index distribution structure of an SMF.

Further, it is also possible to adopt the refractive index distribution structure as shown in FIG. 5, which has a central region 51, an annular region 52, and a clad 53. The refractive index of the central region 51 is lower than the refractive index of the clad 53, and the refractive index of the annular region 52 is higher than the refractive index of the clad 53.

In the examples of the refractive index distribution structure of the optical fiber to be used in the method for winding an optical fiber on a reel of the present invention, it is desirable at least one annular region has the minimum refractive index that is negative. However, this should not be construed restrictively, and a refractive index is freely selectable as long as it is not departing from the scope of the present invention.

Further, it is desirable for the optical fiber for use in the method for winding an optical fiber on a reel of the present invention to exhibit a cutoff wavelength of not more than 1260 nm after it is formed into a cable, whereby the optical fiber can be suitably used in WDM system and it becomes possible to conduct single mode operation around the wavelength of 1300 nm.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A method of winding an optical fiber on a reel, utilizing the optical fiber having the following characteristics:

a cable cutoff wavelength of 1260 nm or less, a zero dispersion wavelength is outside a wavelength range of 1530 to 1565 nm, an absolute value of the dispersion value in the entire wavelength range of 1530 to 1565 nm is in a range of 2 to 14 ps/nm/km, and a bending loss at a wavelength of 1550 nm is in a range of 1 to 100 dB/m, when wound at a diameter of 20 mm; and the reel with a barrel diameter of not less than 100 mm and not more than 200 mm; characterized by winding the optical fiber on the reel so that a transmission loss of the optical fiber after winding on the reel is 0.25 dB/km or less at the wavelength of 1550 nm, and an increase of a transmission loss of the optical fiber is 0.03 dB/km or less at the wavelength of 1550 nm, after the optical fiber is wound on the reel at a length of approximately 25 km.

2. The method of claim 1, wherein the optical fiber wound on the reel does not substantially loosen its winding after dropped in the direction of the center axis of the reel from a height of 75 cm.

3. The method of claim 1, wherein the optical fiber has two or more annular regions between a central region and a clad, and the minimum relative refractive index difference of at least one annular region is negative.

4. The method of claim 2, wherein the optical fiber has two or more annual regions between a central region and a clad, and the minimum relative refractive index difference of at least one annular region is negative.

* * * * *